United States Patent
Tagashira et al.

(10) Patent No.: US 7,058,820 B2
(45) Date of Patent: Jun. 6, 2006

(54) INFORMATION PROCESSING SYSTEM, MEDIUM, INFORMATION PROCESSING APPARATUS, INFORMATION PROCESSING METHOD, STORAGE MEDIUM STORING COMPUTER READABLE PROGRAM FOR REALIZING SUCH METHOD

(75) Inventors: Nobuhiro Tagashira, Kanagawa (JP); Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 10/075,397

(22) Filed: Feb. 15, 2002

(65) Prior Publication Data
US 2002/0133705 A1    Sep. 19, 2002

(30) Foreign Application Priority Data

| Feb. 20, 2001 | (JP) | ............................. 2001-044202 |
| Feb. 12, 2002 | (JP) | ............................. 2002-034122 |

(51) Int. Cl.
H04L 9/32 (2006.01)
H04L 9/00 (2006.01)
H04N 7/167 (2006.01)
H04N 5/00 (2006.01)

(52) U.S. Cl. ...................... 713/193; 713/177; 713/194; 705/51; 705/57; 380/28; 380/201; 380/277

(58) Field of Classification Search ................ 713/193, 713/176, 177, 178, 179, 194; 380/28, 201, 380/277; 705/57, 51
See application file for complete search history.

(56) References Cited

U.S. PATENT DOCUMENTS

| 5,600,720 | A   | 2/1997 | Iwamura et al. ................ 380/1 |
| 5,666,419 | A   | 9/1997 | Yamamoto et al. ............ 380/28 |
| 5,937,395 | A   | 8/1999 | Iwamura ....................... 705/30 |
| 6,088,454 | A   | 7/2000 | Nagashima et al. .......... 380/49 |
| 6,687,802 | B1* | 2/2004 | Kori et al. .................... 705/56 |
| 6,771,794 | B1* | 8/2004 | Osaka ......................... 713/176 |

\* cited by examiner

*Primary Examiner*—Matthew Smithers
*Assistant Examiner*—Courtney Fields
(74) *Attorney, Agent, or Firm*—Fitzpatrick, Cella, Harper & Scinto (57) ABSTRACT

Copyright information embedded in a digital content can always be sampled and the copyright of the digital content can be protected reliably, by using a sampling program which is automatically activated and samples the copyright information from the digital content. For example, the digital content added with the sampling program is distributed or an application program added with the sampling program for utilizing the digital content is distributed so that the copyright information can be reliably sampled from the digital content and the utilization of the digital content can be controlled in accordance with the copyright information. If a file containing a plurality of digital contents is used, copyright information is embedded in each digital content and the copyright information is sampled from each digital content. It is possible to control the utilization of each digital content in accordance with the sampled copyright information.

10 Claims, 10 Drawing Sheets

| READ OUT AUDIO | PERMITTED |
|---|---|
| READ OUT VIDEO | PERMITTED |
| EDIT AUDIO | NOT PERMITTED |
| EDIT VIDEO | PERMITTED |

FIG. 15

| CERTIFICATION METHOD | INTERACT WITH SERVER |
|---|---|
| SERVER'S URL | www.xxx.xo.jp |
| PROTOCOL | DIGITAL CERTIFICATION METHOD |

INFORMATION PROCESSING SYSTEM, MEDIUM, INFORMATION PROCESSING APPARATUS, INFORMATION PROCESSING METHOD, STORAGE MEDIUM STORING COMPUTER READABLE PROGRAM FOR REALIZING SUCH METHOD

BACKGROUND OF THE INVENTION

1. Field of the Invention

The present invention relates to an information processing system for controlling the utilization of digital contents, a medium, an information processing apparatus, an information processing method, and a storage medium storing a computer readable program for realizing such a method.

2. Description of the Related Art

There are recent rapid advancements on preparation and maintenance of optical fiber networks in a backbone communication network, propagation of cable television systems, practical use of satellite communications, propagation of local area networks, and the like. Interconnection of communication networks is vigorously progressing. Digital contents can be exchanged worldwide via such communication networks. The digital contents include character data, audio data, still image data, moving image data, computer programs and the like.

Since a digital content is made of digital information, the digital content can easily be copied. Digital contents pose a problem of copyright protection.

In order to deal with this problem, techniques called "electronic watermark" are used. The "electronic watermark" is techniques of processing a digital content in a predetermined manner to embed optional information in a digital content. The embedded information is hereinafter called "electronic watermark information".

If copyright information is embedded in a digital content as the electronic watermark information by utilizing the electronic watermark techniques, the digital content and copyright information can be processed independently so that the copyright can be protected reliably.

A digital content embedded with electronic watermark information is received at a terminal such as a personal computer via, for example, an arbitrary communication network. If a user of a personal computer activates a preinstalled program for sampling or deriving electronic watermark information, the electronic watermark information can be sampled from the digital content. In other words, the electronic watermark information can be sampled if a user wishes to activate the sampling program.

If a malicious user utilizes a digital content without activating the sampling program or utilizes the digital content in the environment where the sampling program cannot be activated, the function of copyright protection cannot be realized because the electronic watermark information cannot be sampled from the digital content.

SUMMARY OF THE INVENTION

According to an embodiment of the invention, it is an object to provide an information processing system capable of controlling the utilization of a digital content in accordance with electronic watermark information sampled from the digital content, a medium, an information processing apparatus, an information processing method, and a storage medium storing a computer readable program for realizing such a method.

Other objects and features of the present invention will become apparent from the following detailed description of the embodiments when read in conjunction with the accompanying drawings.

DESCRIPTION OF THE PREFERRED EMBODIMENTS

Embodiments of the invention will be described with reference to the accompanying drawings.

First Embodiment

Figure 1:
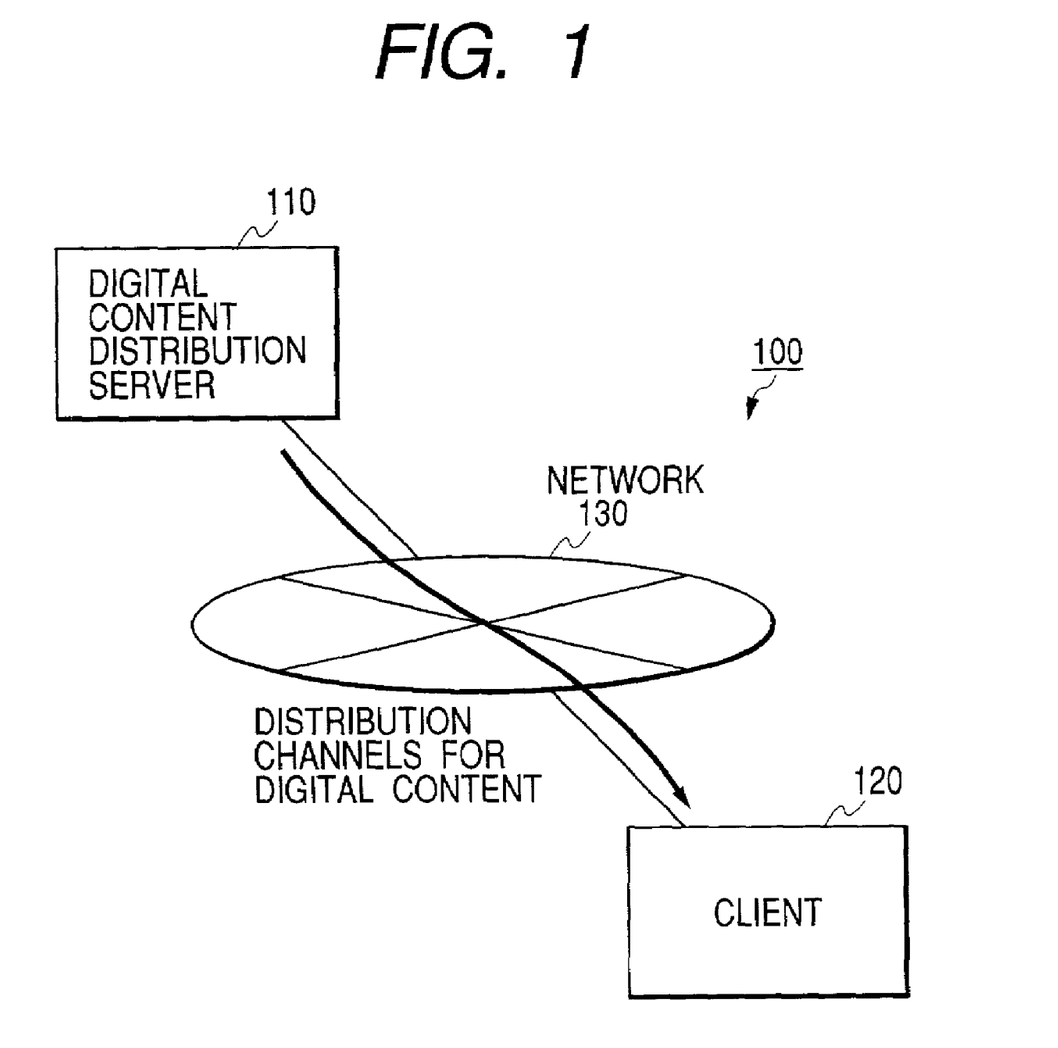
FIG. 1 is a block diagram showing the structure of a network system according to the invention.

The invention is applied, for example, to a network system 100 such as shown in FIG. 1.

As shown in FIG. 1, the network system 100 of the embodiment has a structure that a digital content distribution server 110 and a terminal 120 on a user (client) side (hereinafter simply called a "client") are interconnected by a network 130 for the communications therebetween.

In FIG. 1, although one digital content distribution server 110 and one client 120 are connected via the network 130, a plurality of servers and clients may be interconnected.

The network system 100 of the embodiment is configured so that when a digital content is utilized, the driving program added to the digital content automatically samples the electronic watermark information embedding in the digital content.

The digital content in this embodiment includes character data, audio data, still image data, moving image data, computer programs and the like.

Figure 14:
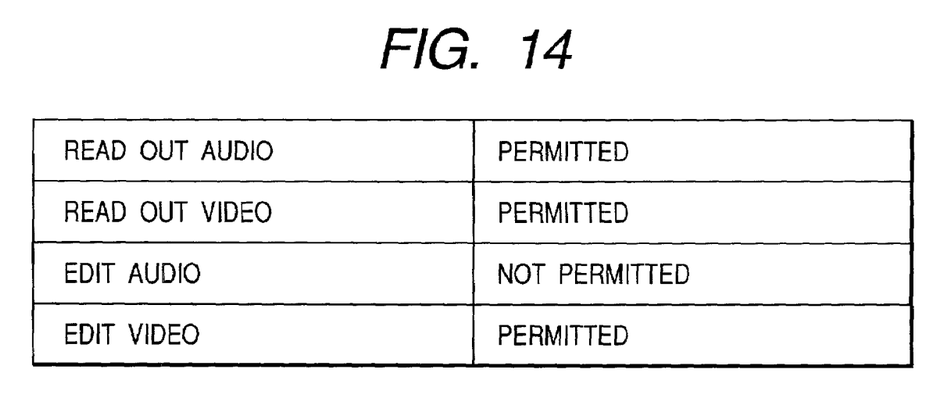
FIG. 14 is a diagram showing an example of copyright information according to the invention.

The electronic watermark information in this embodiment is copyright information embedded in a digital content by using electronic watermark techniques, the copyright information being used for controlling the utilization of the digital content. The copyright information may be stored in a list storing permission information for each utilization mode, such as shown in FIG. 14. A digital content utilization control unit 123 of the client 120 to be later described refers to the copyright information sampled from a digital content and controls the utilization of the digital content in accordance with the permission information for each digital content utilization mode.

For example, the digital content utilization control unit 123 can control the utilization of a digital content by forcibly altering a subject file attribute of the digital content by referring to the sampled copyright information.

The digital content utilization control unit 123 can also control to permit the utilization of the digital content only by a particular application, by always monitoring applications utilizing the digital contents.

The digital content utilization control unit 123 can also control the utilization function (e.g., read, write, print, and etc.) of the digital content by always monitoring application program interface (API) used by various applications.

As shown in FIG. 14, if the digital content is constituted of audio objects and video objects, it is possible to control each object constituting the digital content. For example, it is possible to control not to permit edition of audio objects by invalidating API which edits audio objects, or it is possible to control to permit edition of video objects by validating API which edits video objects.

Figure 15:
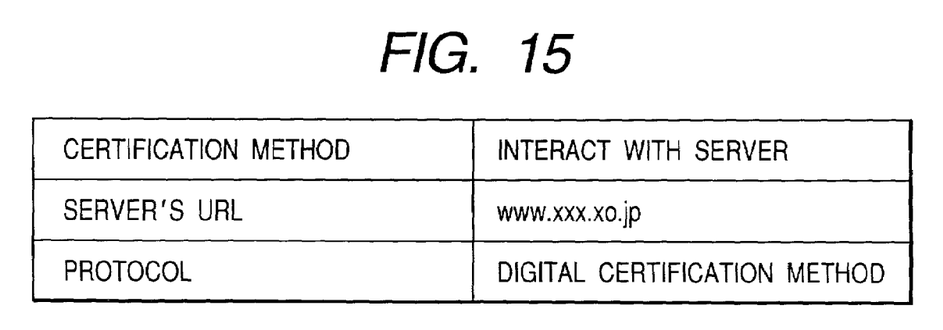
FIG. 15 is a diagram showing an example of copyright information according to the invention.

As shown in FIG. 15, copyright information may be stored in a list storing an authentication method, a server uniform resource locator (URL) on the network 130 and a protocol. In this case, the digital content utilization control unit 123 controls the utilization of a digital content by accessing the server on the network 130 identified by URL by referring to the copyright information sampled from the digital content, and by acquiring the permission information for each digital content utilization mode. A cipher key may be acquired from the server to encipher the digital content by using the cipher key and distribute the enciphered digital content to another terminal.

A digital signature may be entered in the copyright information to verify whether the sampled copyright information is legal. In this case, a verification station (not shown) is provided on the network system 100, which verifies whether the sampled copyright information is legal and notifies the verification result to the client 120, a creator (not shown) of the digital content, the content distribution server 110 and the like.

The sampling program will be described which automatically samples electronic watermark information embedded in a digital content.

The sampling program is created in such a manner that even if a digital content is copied, a copy of itself (driving program) is added to the copy of the digital content. The sampled program is automatically activated when a digital content is executed. The sampling program depends on an operation system (OS) if the digital content is an executable file. If a digital content is stored in a storage medium such as a hard disc and a floppy disc, the sampling program is added to the system area of the storage medium and depends upon the hardware architecture. If a digital content is data of particular application software, the driving program depends upon the application software because it uses the macro functions of the application software.

Figure 2:
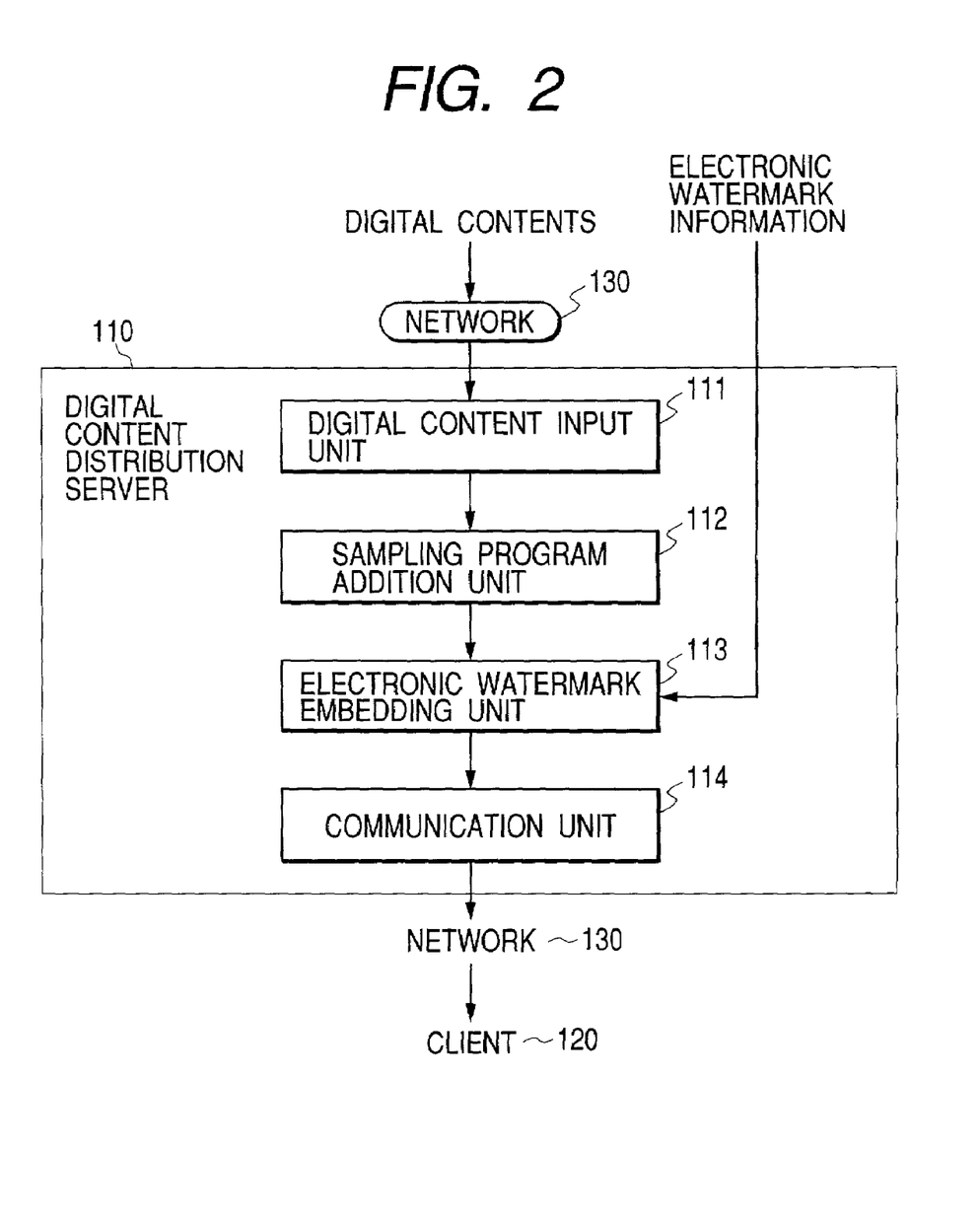
FIG. 2 is a block diagram showing the structure of a digital content distribution server according a first embodiment of the invention.

FIG. 2 is a diagram showing the internal structure of the digital content distribution server 110 of the network system 100.

As shown in FIG. 2, the digital content distribution server 110 includes a digital content input unit 111, a sampling program addition unit 112, an electronic watermark embedding unit 113, and a communication unit 114.

Figure 3:
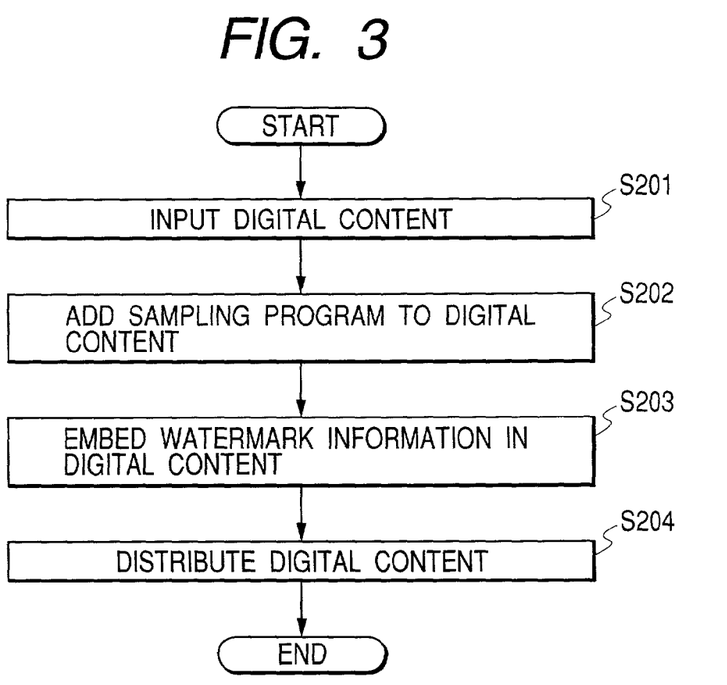
FIG. 3 is a flow chart illustrating an operation of the digital content distribution server according to the first embodiment of the invention.

The operation of the digital content distribution server 110 will be described with reference to FIG. 3.

Step S201: The digital content input unit 111 acquires a digital content in order to distribute it to the client 120 via the network 130. For example, this digital content was requested by the client 120 via the network 130 to the digital content distribution server 110.

Step S202: The sample program addition unit 112 adds the sampling program for sampling the electronic watermark information to the digital content acquired by the digital content input unit 111. This sampling program is so created that when the digital content is executed, the program automatically starts.

The sampling program may be embedded in the digital content by using electronic watermark techniques.

Step S203: The electronic watermark embedding unit 113 embeds the electronic watermark information in the digital content added with the sampling program by the sampling program addition unit 112.

Step S204: The communication unit 114 transmits the digital content added with the sampling program by the sampling program addition unit 112 and embedded with the electronic watermark information by the electronic watermark embedding unit 113, to the client 120 via the network 130.

In this embodiment, the digital content distribution server 110 adds the sampling program to the digital content (Step S202), and thereafter embeds the electronic watermark information (Step S203). It is therefore possible to transmit a digital content embedded with only the electronic watermark information and still not embedded with the sampling program.

The embodiment is not limited only to this process order. For example, the process order may be changed in accordance with a sampling program adding method, an electronic watermark information embedding method or the like.

Figure 4:
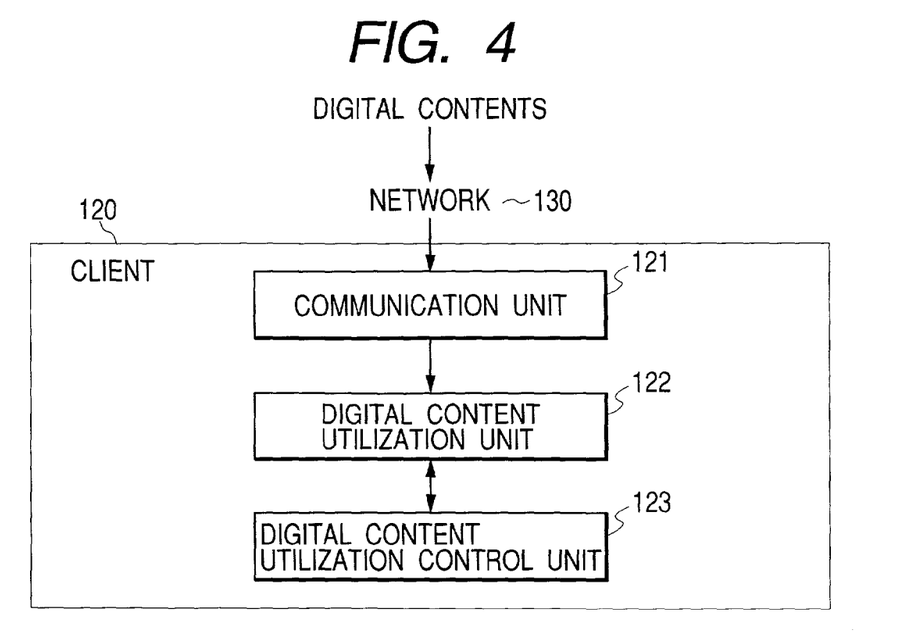
FIG. 4 is a block diagram showing the structure of a client according to the first embodiment of the invention.

FIG. 4 shows the internal structure of the client 120 of the network system 100.

As shown in FIG. 4, the client 120 has a communication unit 121, a digital content utilization unit 122, and a digital content utilization control unit 123.

Figure 5:
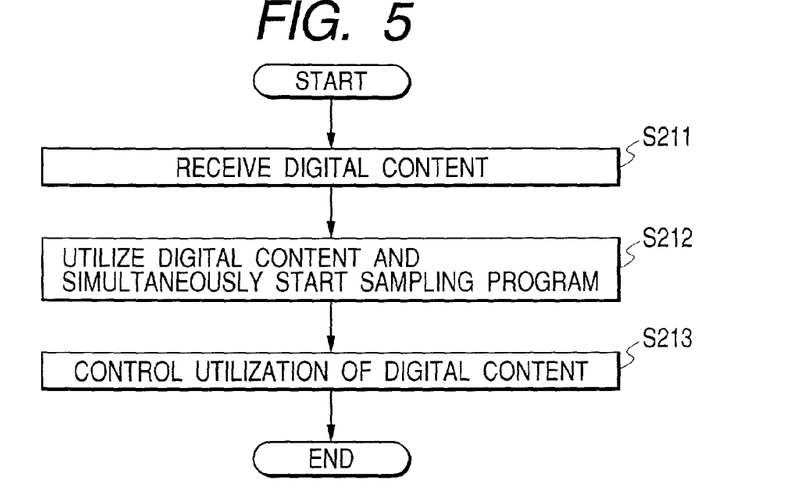
FIG. 5 is a flow chart illustrating an operation of the client according to the first embodiment of the invention.

The operation of the client 120 constructed as above will be described with reference to FIG. 5.

Step S211: The communication unit 121 receives a digital content from the digital content distribution server 110 via the network 130. This digital content was embedded with the electronic watermark information and added with the electronic watermark information sampling program.

Step S212: In response to an operation instruction from a user, the digital content utilization unit 122 processes (utilizes) the digital content received by the communication unit 121. In this case, at the same time when the digital content is executed, the sampling program added to the digital content is activated. Therefore, at the same time when the digital content is utilized by the digital content utilization unit 122, the electronic watermark information embedded in the digital content is automatically sampled.

Step S213: In accordance with the electronic watermark information automatically sampled from the digital content, the digital content utilization control unit 123 controls the utilization of the digital content. The control of the digital content utilization may include inhibiting the edition of a digital content as shown in the copyright information of FIG. 14, inhibiting the copy of a digital content, notifying the utilization of a digital content to the digital content distribution server 110 and the like. However, the embodiment is not limited only thereto.

In this embodiment, the utilization of a digital content is controlled by the digital content utilization control unit 123 of the client 120. The embodiment is not limited only thereto. For example, some control of a digital content may be performed by the digital content utilization control unit 123 instead of making the control unit execute the whole of the control.

More specifically, the control of a digital content may be performed by both the sampling program added to the digital content and the digital content utilization control unit 123 in order to take partial charges of control functions. In this case, it is possible to prevent a malicious user (illegal user) of a digital content from disabling the digital content utilization control unit 123 of the client 120 and illegally utilizing the digital content.

Furthermore, rough utilization control such as permission and inhibition of utilization of a digital content may be performed by the sampling program, whereas fine utilization control such as utilization contents (e.g., edition degree, edition allowed range, and etc.) of a digital content may be performed by the digital content utilization control unit 123. More specifically, when the sampling program samples the electronic watermark information representative of "utilization inhibition" of the digital content, the sampling program may control to delete the digital content from the client 120.

In this embodiment, although a digital content is distributed to the digital content distribution server 110 and client 120 via the network 130, the digital content may be distributed by storing it in a storage medium such as a CD-ROM, a floppy disc, a CD-R and a DVD, not limiting only to the communication medium such as the network 130.

As described above, in this embodiment, the electronic watermark information and electronic watermark information sampling program are added to a digital content, and at the same time when the digital content is utilized, the sampling program added to the digital content is automatically activated.

It is therefore possible to always sample the electronic watermark information embedded in the digital content and to reliably protect the copyright of the digital content.

In this embodiment, although the sampling program is automatically activated when the digital content is utilized, a judgement unit for judging whether the sampling program is activated may be provided to restrict the utilization of a digital content in accordance with the judgement result. For example, if the judgement unit judges that the sampling program was not activated, the digital content is made unable to be utilized, such as deletion thereof, or a message "there is a possibility of illegal action against the digital content" is notified to the digital content distribution server 110.

Second Embodiment

The structures and operations of a digital content distribution server 110 and a client 120 of the second embodiment will be described with reference to the accompanying drawings.

Similar to the first embodiment, the network system 100 shown in FIG. 1 is applied to the second embodiment.

Figure 6:
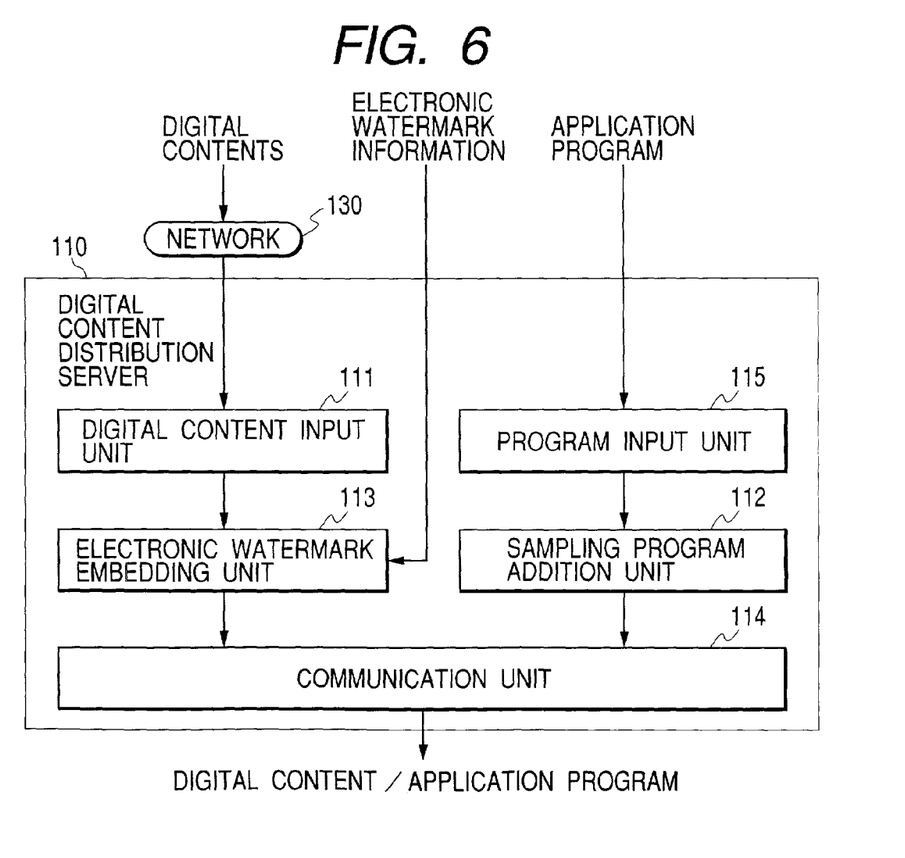
FIG. 6 is a block diagram showing the structure of a digital content distribution server according to a second first embodiment of the invention.

FIG. 6 shows the internal structure of the digital content distribution server 110 of the second embodiment.

As shown in FIG. 6, the digital content distribution server 110 of the second embodiment is constituted of the constituent elements 111 to 114 shown in FIG. 2 and a program input unit 115.

Figure 7:
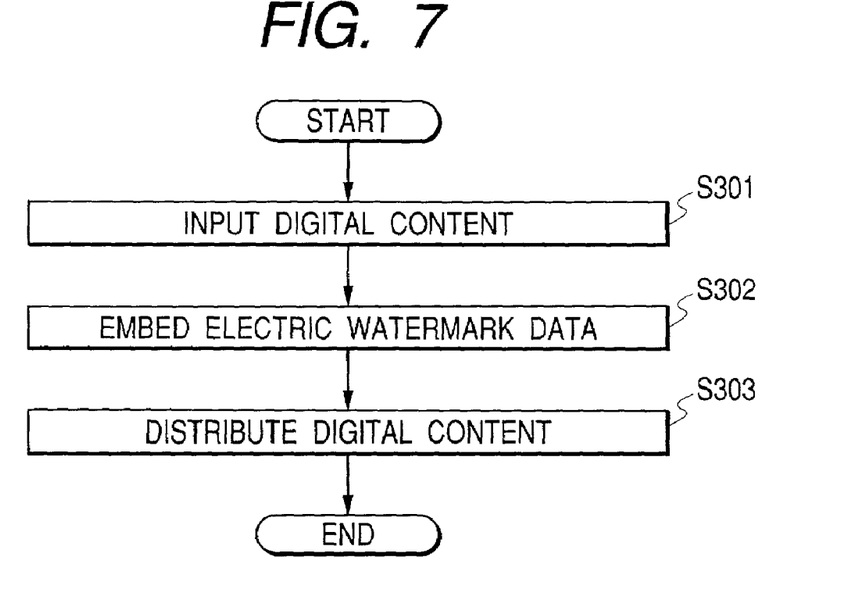
FIG. 7 is a flow chart illustrating an operation of the digital content distribution server according to the second embodiment of the invention.
Figure 8:
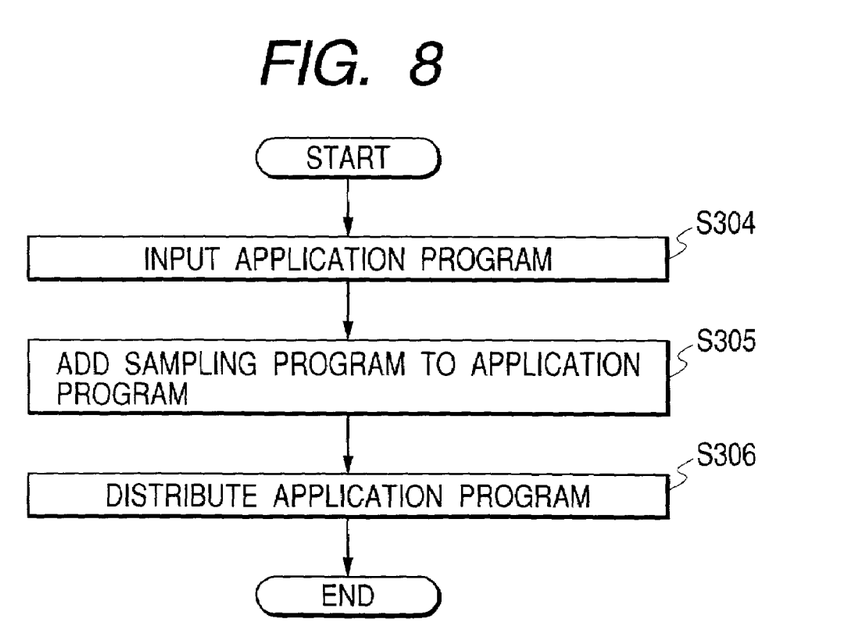
FIG. 8 is a block diagram showing the structure of the digital content distribution server according to the second first embodiment of the invention.

The operation of the digital content distribution server 110 constructed as above will be described with reference to FIGS. 7 and 8.

Step S301: The digital content input unit 111 acquires a digital content in order to distribute it to the client 120 via the network 130. For example, this digital content was requested by the client 120 via the network 130 to the digital content distribution server 110.

Step S302: The electronic watermark embedding unit 113 embeds the electronic watermark information in the digital content acquired by the digital content input unit 111.

Step S303: The communication unit 114 transmits the digital content embedded with the electronic watermark information by the electronic watermark embedding unit 113, to the client 120 via the network 130.

Step S304: The program input unit 115 of the digital content distribution server 110 acquires an application program in order to distribute it over the network 130. For example, this application program was requested by the client 120 via the network 130 to the digital content distribution server 110. For example, the application program is a desk top publishing (DTP) program, a viewer program or the like.

Step S305: The sample program addition unit 112 adds the sampling program for sampling the electronic watermark information to the application program acquired by the program input unit 115.

This sampling program is automatically executed when the application program is executed. The sampling program may be embedded in the application program by using electronic watermark techniques.

Step S306: The communication unit 114 transmits the application program added with the sampling program by the sampling program addition unit 112, to the client 120 via the network 130.

Figure 9:
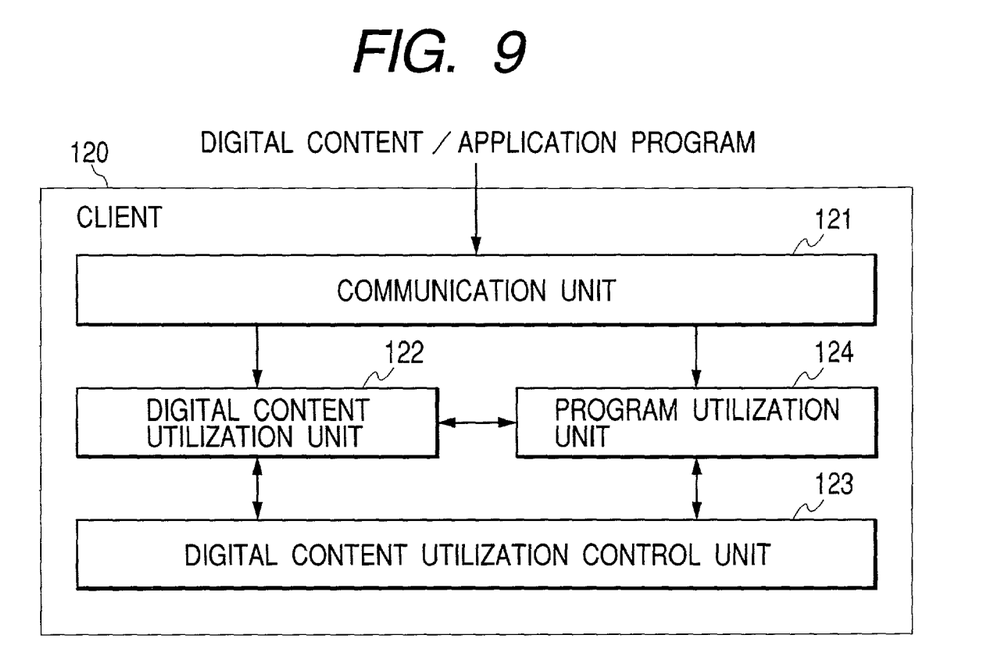
FIG. 9 is a block diagram showing the structure of a client according to the second embodiment of the invention.

FIG. 9 shows the internal structure of the client 120 of the second embodiment.

As shown in FIG. 9, the digital content distribution server 110 of the second embodiment is constituted of the constituent elements 121 to 123 shown in FIG. 4 and a program utilization unit 124.

Figure 10:
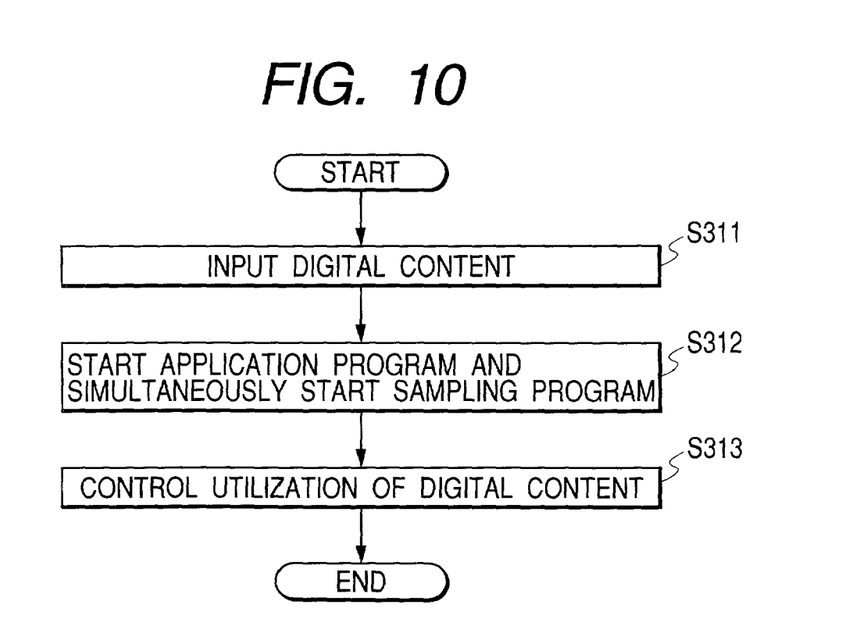
FIG. 10 is a flow chart illustrating an operation of the client according to the second embodiment of the invention.

The operation of the client 120 constructed as above will be described with reference to FIG. 10.

Step S311: The communication unit 121 receives a digital content and an application program transmitted from the digital content distribution server 110 via the network 130. This digital content was embedded with the electronic watermark information, and the application program was added with the sampling program for sampling the electronic watermark information from the digital content.

Step S312: In response to an operation instruction from a user, the program utilization unit 124 activates the application program received by the communication unit 121, and the digital content utilization unit 122 processes (utilizes) the digital content received by the communication unit 121. In this case, at the same time when the application program is executed by the program utilization unit 124, the sampling program added to the application program is automatically activated. Therefore, at the same time when the digital content is utilized by the digital content utilization unit 122, the electronic watermark information embedded in the digital content is automatically sampled.

Step S313: In accordance with the electronic watermark information automatically sampled from the digital content, the digital content utilization control unit 123 controls the utilization of the digital content. The control of the digital content utilization may include inhibiting the edition of a digital content, inhibiting the copy of a digital content, and the like. However, the embodiment is not limited only thereto.

In the second embodiment, the digital content distribution server 110 having the structure shown in FIG. 6 transmits separately the digital content embedded with the electronic watermark information and the application program added with the electronic watermark information sampling program, to the client 120. The embodiment is not limited only thereto. For example, the integrated or combined digital content and application program may be transmitted.

For example, a file formed typically by MS-Word combines a main portion (digital content) of Ascii code trains and a supplemental information portion (application program) such as attribute information and macro of the digital content. Such a file contains a plurality of digital contents in some cases.

Figure 11:
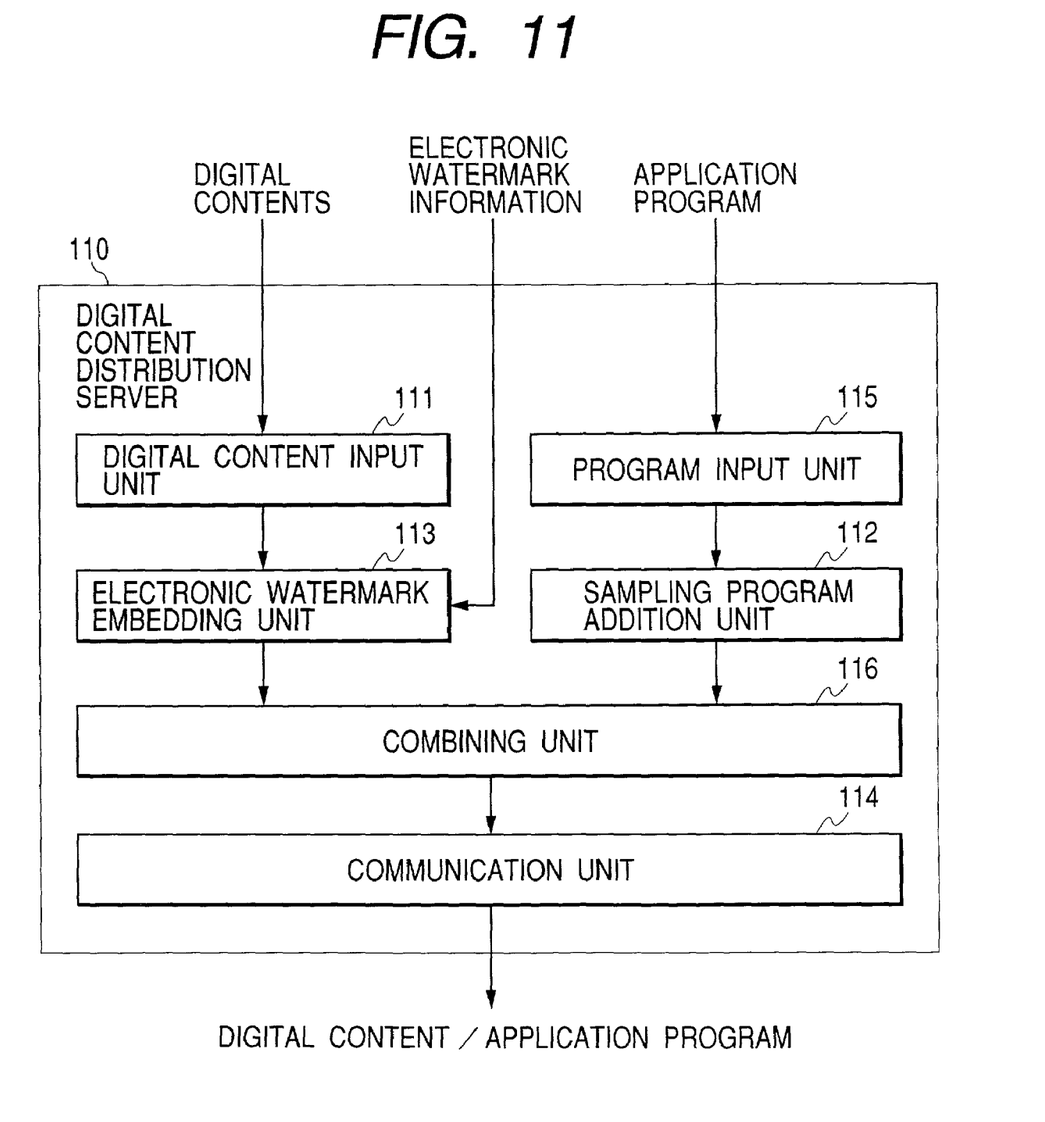
FIG. 11 is a block diagram showing the structure of another digital content distribution server according to the invention.

In such cases, as shown in FIG. 11, the digital content distribution server 110 is provided with a combining unit 116 which combines the digital content embedded with copyright information output from the electronic watermark embedding unit 113 and the application program with the sampling program output from the sampling program addition unit 112, and supplies the combined digital content and application program to the communication unit 114. In this manner, a file combining the digital content and application program can be distributed. The combining unit 116 can distribute a single file combining an application program output from the sampling program addition unit 112 and a plurality of digital contents output from the electronic watermark embedding unit 113.

Figure 12:
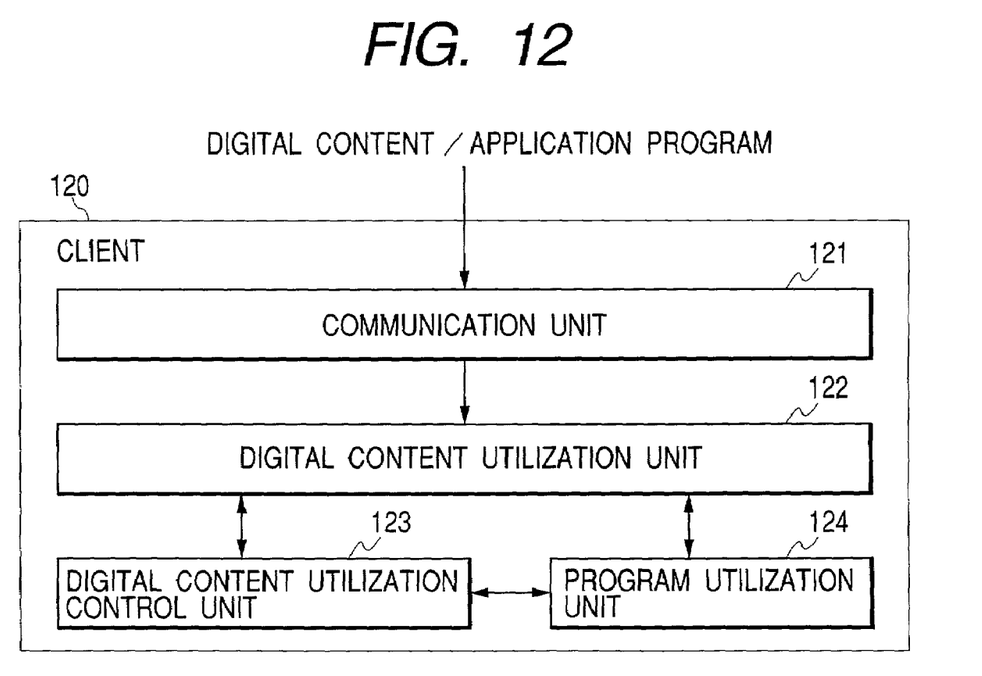
FIG. 12 is a block diagram showing the structure of a client according to the invention.

As shown in FIG. 12, in accordance with the copyright information of each digital content sampled by the sampling program, the digital content utilization control unit 122 of the client 120 controls the utilization of each digital content by the program utilization unit 124.

In this manner, even if a file contains a plurality of digital contents, the utilization control can be performed one digital content after another.

As described above, in this embodiment, if a digital content is utilized by using an application program such as a DTP program and a viewer program, at the same time when the application program starts, the sampling program added to the application program automatically starts.

It is therefore possible to reliably sample the electronic watermark information from a digital content when the digital content is utilized by using an application program.

In the second embodiment, a digital content can be utilized by starting an application program added with the sampling program. The invention is not limited only to the case wherein a digital content can be utilized by directly activating an application program added with the sampling program.

Recent application programs are highly sophisticated, and many applications are divided into libraries, plug-in and the like for respective functions. In such a case, the sampling program may be added to the library, plug-in and the like to be activated by the application program.

Furthermore, if the sampling program is added only to a single program, there may occur the case that this single program is not activated. In order to avoid this, the sampling program may be added to a program having a high activation frequency or to a plurality of programs.

In this embodiment, although a digital content and an application program are distributed to the digital content distribution server 110 and client 120 via the network 130, the digital content and application program may be distributed by storing them in a storage medium such as a CD-ROM, a floppy disc, a CD-R and a DVD, not limiting only to the communication medium such as the network 130.

Other Embodiments

It is obvious that the objects of the invention can be realized by supplying an apparatus or system with a storage medium storing software program codes realizing the functions of the host and terminal of the first and second embodiments and by making a computer (or CPU or MPU) of the apparatus or system read and execute the program codes.

In this case, the software program codes themselves read from the storage medium realize the functions of the first and second embodiments. Therefore, the storage medium storing the program codes constitutes the present invention.

The storage medium for storing such program codes may be a ROM, a floppy disk, a hard disk, an optical disk, a magneto optical disk, a CD-ROM, a CD-R, a magnetic tape, a nonvolatile memory card, or the like.

It is obvious that the scope of the invention contains the case wherein not only the functions of the first and second embodiments are realized by executing the program codes read by a computer but also the functions of the first and second embodiments are realized by making an OS or the like running on a computer perform a portion or the whole of the actual processes in accordance with the program codes.

It is obvious that the scope of the invention also contains the case wherein the functions of the first and second embodiments can be realized by writing the program codes into a memory of a function expansion board inserted into a computer or of a function expansion unit connected to the computer, and thereafter by making a CPU of the function expansion board or function expansion unit execute a portion or the whole of actual processes.

Figure 13:
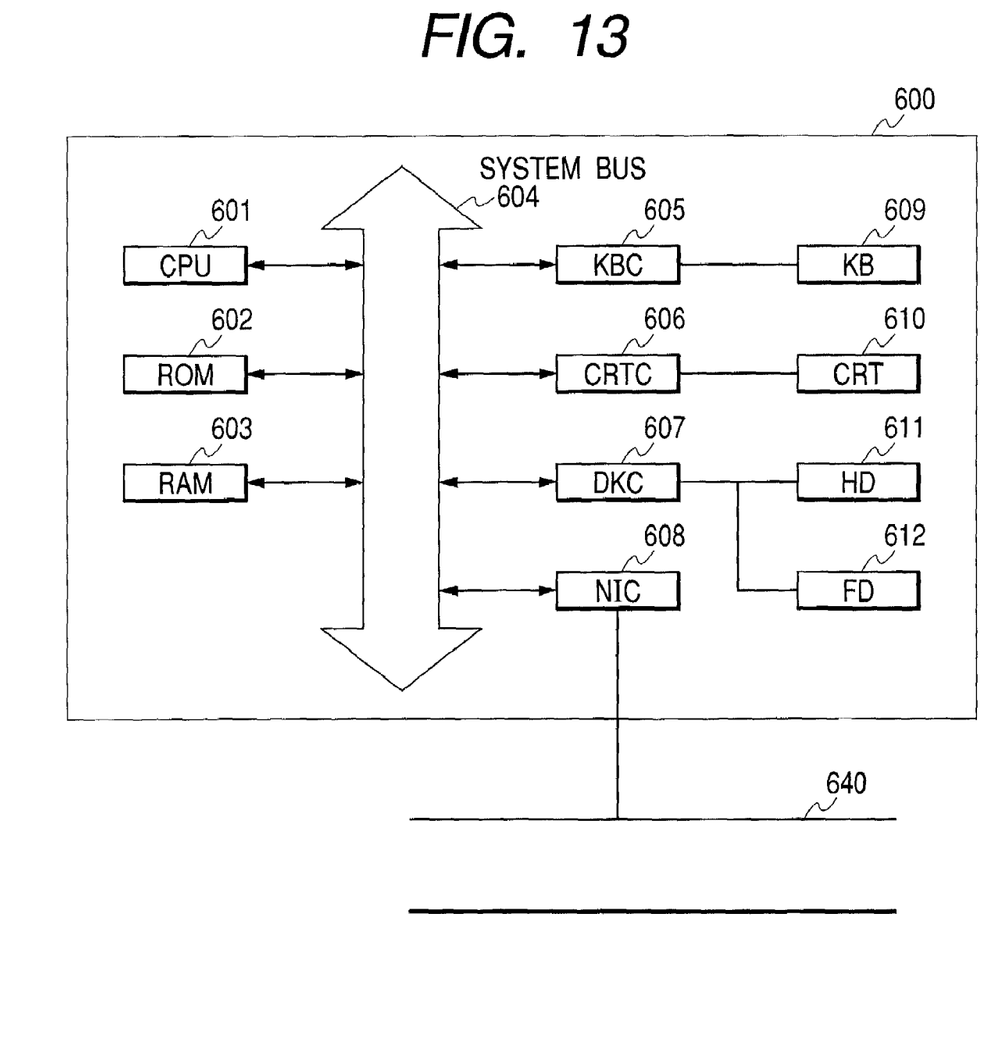
FIG. 13 is a block diagram showing the structure of a computer function of a digital content distribution server and client according to the invention.

FIG. 13 shows an example of the structure of a computer function 600. Each of the digital content distribution server 110 and client 120 is provided with the computer function 600, and a CPU 601 operates to realize the operations of the first and second embodiments.

As shown in FIG. 13, the compute function 600 is realized by CPU 601, a ROM 602, a RAM 603, a keyboard controller (KBC) 605 for a keyboard (KB) 609, a CRT controller (CRTC) 606 for a CRT display (CRT) 610 as a display unit, a disc controller (DKC) 607 for a hard disc (HD) 611 and a floppy disc (FD) 612, and a network interface card (NIC) 608, respectively connected by a system bus 604 for communications among them.

The network interface card (NIC) 608 is connected to a network 640 such as the network 130 shown in FIG. 1.

CPU 601 executes software stored in ROM 602 or HD 611 or software supplied from FD 612 to collectively control the constituent elements connected to the system bus 604.

CPU 601 reads a program satisfying a predetermined process sequence from ROM 602, HD611, or FD 612 and executes it to realize the operations of the first and second embodiments.

RAM 603 functions as the main memory, working area and the like of CPU 601. KBC 605 controls inputs supplied from an unrepresented pointing device or the like. CRTC 606 controls a display of CRT 610.

DKC 607 controls an access to HD 611 and FD 612 which store a boot program, various applications, editor files, user files, network management programs and predetermined programs for realizing the functions of the embodiments. NIC 608 transfers data to and from the apparatus or system on the network. 140.

What is claimed is:

1. An information processing system including a terminal apparatus and a server:

said server comprising:

addition means for adding a sampling program to a digital content, the sampling program being automatically activated to sample information embedded as an electronic watermark in the digital content;

embedding means for embedding utilization control information of the digital content as an electronic watermark in the digital content having the added sampling program; and transferring means for transferring the digital content having the embedded utilization control information; and said terminal apparatus comprising:

receiving means for receiving the digital content with the added sampling program and the utilization control information embedded by said server;

sampling means for automatically activating the sampling program and sampling the utilization control information from the digital content; and control means for controlling the digital content in accordance with the sampled utilization control information.

2. An information processing apparatus comprising:

addition means for adding a sampling program to a digital content, the sampling program being automatically activated to sample information embedded as an electronic watermark in the digital content;

embedding means for embedding utilization control information of the digital content as an electronic watermark in the digital content having the added sampling program; and output means for outputting the digital content having the embedded utilization control information.

3. An information processing apparatus comprising:

input means for inputting digital content including a sampling program which is automatically activated to sample information embedded as an electronic watermark in the digital content;

sampling means for sampling utilization control information embedded as an electronic watermark in the digital content; and control means for controlling utilization of the digital content in accordance with the sampled utilization control information.

4. An information processing method comprising:

an addition step of adding a sampling program to a digital content, the sampling program being automatically activated to sample information embedded as an electronic watermark in the digital content;

an embedding step of embedding utilization control information of the digital content as an electronic watermark in the digital content having the added sampling program; and an output step of outputting the digital content having the embedded utilization control information.

5. An information processing method comprising:

an input step of inputting digital content including a sampling program which is automatically activated to sample information embedded as an electronic watermark in the digital content;

a sampling step of sampling utilization control information embedded as an electronic watermark in the digital content; and a control step of controlling utilization of the digital content in accordance with the sampled utilization control information.

6. A computer-readable storage medium storing a program for executing steps of an information processing method, the program comprising:

an addition step of adding a sampling program to a digital content, the sampling program being automatically activated to sample information embedded as an electronic watermark in the digital content;

an embedding step of embedding utilization control information of the digital content as an electronic watermark in the digital contents having the added sampling program; and an output step of outputting the digital content having the embedded utilization control information.

7. A computer-readable storage medium storing a program for executing steps of an information processing method, the program comprising:

an input step of inputting digital content including a sampling program which is automatically activated to sample information embedded as an electronic watermark embedded in the digital content;

a sampling step of sampling utilization control information embedded as an electronic watermark in the digital content; and a control step of controlling utilization of the digital content in accordance with the sampled utilization control information.

8. An information processing system including a terminal apparatus and a server:

said server comprising:

embedding means for embedding utilization control information of digital content as an electronic watermark in the digital content;

addition means for adding a sampling program to an application program for utilizing the digital content, the sampling program being automatically activated to sample information embedded as an electronic watermark in the digital content;

transferring means for transferring the digital content and the application program to which the sampling program is added; and said terminal apparatus comprising:

receiving means for receiving the application program and the digital content from said server;

sampling means for automatically activating the sampling program added to the application program and sampling the utilization control information from the digital content; and control means for controlling the digital content in accordance with the sampled utilization control information.

9. An information processing apparatus comprising:

embedding means for embedding utilization control information of digital content as an electronic watermark in the digital content;

addition means for adding a sampling program to an application program for utilizing the digital content, the sampling program being automatically activated to sample information embedded as an electronic watermark in the digital content; and output means for outputting the digital content and the application program to which the sampling program is added.

10. An information processing method comprising:

an embedding step of embedding utilization control information of digital content as an electronic watermark in the digital content;

an addition step of adding a sampling program to an application program for utilizing the digital content, the sampling program being automatically activated to sample information embedded as an electronic watermark in the digital content; and an output step of outputting the digital content and the application program to which the sampling program is added.

* * * * *

UNITED STATES PATENT AND TRADEMARK OFFICE
CERTIFICATE OF CORRECTION

| | |
|---|---|
| PATENT NO. | : 7,058,820 B2 |
| APPLICATION NO. | : 10/075397 |
| DATED | : June 6, 2006 |
| INVENTOR(S) | : Nobuhiro Tagashira et al. |

It is certified that error appears in the above-identified patent and that said Letters Patent is hereby corrected as shown below:

COLUMN 10:
Line 29, "contents" should read --content--.

Signed and Sealed this

Twenty-sixth Day of December, 2006

JON W. DUDAS
*Director of the United States Patent and Trademark Office*